United States Patent [19]
Shiokama

[11] Patent Number: 5,867,737
[45] Date of Patent: Feb. 2, 1999

[54] CAMERA SYSTEM WITH INTERCHANGEABLE LENSES HAVING VARYING APERTURE SETTING DEVICES

[75] Inventor: Yoshiharu Shiokama, Chiba-ken, Japan

[73] Assignee: Nikon Corporation, Tokyo, Japan

[21] Appl. No.: 979,562

[22] Filed: Nov. 26, 1997

[30] Foreign Application Priority Data

Dec. 9, 1996 [JP] Japan .................................. 8-342362

[51] Int. Cl.$^6$ ................. G03B 7/00; G03B 7/20
[52] U.S. Cl. .................... 396/237; 296/238; 296/529
[58] Field of Search .................. 396/237, 238, 396/239, 213, 529

[56] References Cited

U.S. PATENT DOCUMENTS 3,394,644 7/1968 Ettischer ........................ 396/529 X
4,582,412 4/1986 Wakabayashi ................... 396/238 X Primary Examiner—W. B. Perkey

[57] ABSTRACT

A camera system having a camera body adapted to operate with multiple types of interchangeable lenses, some of the lenses having an aperture ring and other of the lenses without an aperture ring. Based upon a signal, received via a contact point, a determination is made whether an attached interchangeable lens having an aperture ring is mounted on the camera body. Subsequently, if the attached interchangeable lens has an aperture ring, a control circuit permits aperture control of the lens photographic optical system by an aperture control circuit if an aperture interlocking ring of the camera body detects that the set aperture value is at a minimum value. The aperture control circuit restricts aperture control of the photographic optical system if the set aperture value is not at the minimum value. Upon determining that a mounted interchangeable lens does not have an aperture ring, the control circuit permits the aperture control of the lens photographic optical system by the aperture control circuit, regardless of the detection results by the aperture interlocking ring. Proper aperture control is achieved regardless of the type of interchangeable lens. Consequently, operational errors are eliminated and the manipulations required by the photographer are simplified, thereby improving the camera system's operational capability.

13 Claims, 6 Drawing Sheets

CAMERA SYSTEM WITH INTERCHANGEABLE LENSES HAVING VARYING APERTURE SETTING DEVICES

CROSS-REFERENCE TO RELATED APPLICATIONS

This application is based upon and claims the benefit of Japanese Patent Application No. 08-342362, filed Dec. 9, 1996, the contents being incorporated herein by reference.

BACKGROUND OF THE INVENTION

The present invention relates to a camera system having interchangeable lenses, wherein some of the lenses have an aperture preset operation member and some of the lenses do not have an aperture preset operation member.

Various control modes are known for controlling exposure during photographic operation. For example, such known modes include a manual mode (M mode), a shutter speed priority mode (S mode), an aperture priority mode (A mode), and a program mode (P mode). The manual mode (M mode) allows a photographer to freely set both shutter speed and aperture value. The shutter speed priority mode (S mode) allows the photographer to set the shutter speed while the camera automatically sets the aperture value. The aperture priority mode (A mode) allows the photographer to set the aperture value while the camera automatically sets the shutter speed. Finally, in the program mode (P mode) the camera automatically sets both shutter speed and aperture value. Of these modes, both the M mode and A mode require operational members, e.g., switches, dials and the like, to allow the photographer to set the aperture value.

For a camera system having interchangeable lenses, there are two methods by which an aperture value may be set. First, the aperture can be set using an aperture ring on the lens. Second, a setting member on the camera body may set the aperture value. In general, camera systems are standardized across the range of lenses and use one of the noted methods. In other words, any one camera system exclusively uses one of the above-noted methods. Japanese Laid-Open Patent Publication Number 63-123028 discloses a technology that employs both methods for use with lenses having an aperture ring. In general, the '028 publication is directed to a system identifying whether the mounted interchangeable lens is aperture controllable and switching to the appropriate mode. Accordingly, the aperture value is set either by an aperture ring on the interchangeable lens or by the camera's aperture setting device.

To meet the diverse needs of users, camera bodies that are capable of setting the aperture value while using interchangeable lens without an aperture ring are being developed. Additionally, traditional camera bodies that are capable of setting the aperture value using an aperture ring on the mounted lens continue to be developed. Depending on the combination of camera bodies and interchangeable lenses, some functions may be redundant, or one function may interfere with another function. The camera system, as a whole, may become too complicated and confusing for users if these functions are available at the same time or cancel each other out.

The current solution is to design a camera body that accommodates only one type of interchangeable lens, so as to prevent complicating the camera system and to simplify handling. However, it is preferable to allow multiple types of interchangeable lenses to be mounted on a camera body so as to increase compatibility of the various interchangeable lenses across various existing and future camera systems.

SUMMARY OF THE INVENTION

Accordingly, it is an object of the present invention to provide a camera system having improved operability when using multiple types of interchangeable lens on a single camera body.

It is also an object of the present invention to provide a camera body, for a camera system, able to accept and efficiently utilize a wide variety of lenses.

Additional objects and advantages of the invention will be set forth in part in the description, which follows, and, in part, will be obvious from the description, or may be learned by practice of the invention.

Objects of the present invention are achieved in a camera system comprising a first interchangeable lens having an aperture with an aperture controller which controls the aperture of the interchangeable lens based on a control process originated by the camera body, an aperture preset operation member to set the aperture value for the photographic optical system, in advance, regardless of the control process from the camera body and which restricts the aperture control of the aperture controller to the aperture that has been set by the aperture preset operation member, and at least one interchangeable lens which has an aperture but does not have an aperture preset operation member.

Objects of the present invention are also achieved in a camera system, as set forth above, having a camera body with a controller which controls the aperture of an interchangeable lens and a detector which detects aperture information regarding an aperture value set by an aperture preset operation member on the interchangeable lens.

Objects of the present invention are also achieved in a camera system, as set forth above, wherein the interchangeable lenses output information indicating whether the interchangeable lens has an aperture preset operation member.

Objects of the present invention are also achieved in a camera system, as set forth above, wherein the camera body receives information regarding the presence of an aperture preset operation member from the interchangeable lenses and an aperture control permission member.

Objects of the present invention are also achieved in a camera system, as set forth above, wherein the aperture control permission member permits aperture control by the controller, if it is determined that the mounted interchangeable lens has an aperture preset operation member, based on the information as to the presence of aperture preset operation member, and when, based on the aperture information from the mounted interchangeable lens, the detector detects that the set aperture value is a specific value, while restricting the aperture control by the controller when the detector detects that the set aperture value is not a specific value.

Objects of the present invention are also achieved in a camera system, as set forth above, wherein aperture control by the controller is permitted regardless of the detection results from the detector if it is determined that the mounted interchangeable lens does not have an aperture preset operation member.

Objects of the present invention are further achieved in a camera body which can receive an interchangeable lens having an aperture controller which controls the aperture of the interchangeable lens based on control from the camera body and an aperture preset operation member which sets the aperture value of the interchangeable lens in advance, regardless of control from the camera body, and which restricts the aperture control by the aperture controller with an aperture set by the aperture preset operation member, and at least one more interchangeable lens having an aperture without an aperture preset operation member.

Objects of the present invention are also achieved in a camera body, as set forth above, wherein the camera body has a controller to control the aperture of the interchangeable lens and a detector which detects aperture information regarding the aperture value set by the aperture preset operation member.

Objects of the present invention are also achieved in a camera system, as set forth above, wherein the interchangeable lens outputs information as to whether the interchangeable lens has an aperture preset operation member.

Objects of the present invention are also achieved in a camera system, as set forth above, wherein the camera body receives information as to the presence of an aperture preset operation member from the interchangeable lens and an aperture control permission member.

Objects of the present invention are also achieved in a camera system, as set forth above, wherein the aperture control permission members permit aperture control of the interchangeable lens by the controller if it is determined that the mounted interchangeable lens has an aperture preset operation member, and when, based on the aperture information from the mounted interchangeable lens, the detector detects that the set aperture value is a specific value, while restricting the aperture control of the interchangeable lens by the controller when the detector detects that the set aperture value is not a specific value.

Objects of the present invention are also achieved in a camera system, as set forth above, wherein aperture control of the interchangeable lens is performed by the controller regardless of the detection results from the detector if it is determined that the mounted interchangeable lens does not have an aperture preset operation member.

Objects of the invention are further achieved in a camera system having a first interchangeable lens with an aperture controller which sets an aperture value based on an external control signal and an aperture preset operation member which sets the aperture value regardless of the external control signal from the camera body, the first interchangeable lenses having an output which outputs information indicating the presence of the aperture preset operation member, a second interchangeable lens having an aperture controller but lacking an aperture preset operation member, the second interchangeable lens having an output which outputs information indicating the lack of an aperture preset operation member, and a camera body to which the first and second interchangeable lenses may be interchangeably attached, the camera body having an aperture control circuit which issues the external signal to the attached first or second interchangeable lens, a detector which detects the aperture value set by the aperture preset operation member on the first interchangeable lenses, an input to receive the information as to the presence of the aperture preset operation member from the attached first or second interchangeable lens, and a control circuit which when the first interchangeable lens is attached, permits control of the aperture by the aperture control circuit if the detector detects that the aperture value set by the aperture preset operation member is a specific value or restricts the control of the aperture by the aperture control circuit when the detector detects that the set aperture value is not a specific value, and when the second interchangeable lens is attached, the control circuit permits control of the aperture by the aperture control circuit.

Objects of the present invention are also achieved in a camera body having a controller to control an aperture of a photographic optical system in an attached interchangeable lens, a detector to detect the aperture value of the interchangeable lens, an input which receives information indicating whether the interchangeable lens has an aperture preset operation member from the interchangeable lens, an aperture control permission member permitting the aperture control of the photographic optical system by the controller if the mounted interchangeable lens has an aperture preset operation member and when the detector detects that the set aperture value is a specific value and, when the aperture value is not the specific value, restricting the aperture control of the photographic optical system by the controller, and permitting the aperture control of the photographic optical system by the controller regardless of the detection results from the detector if the interchangeable lens does not have an aperture preset operation member.

Objects of the present invention are also achieved in a lens having an optical system, an aperture which restricts light passages through the optical system, and a storage which stores an indication of whether the lens is provided with an aperture preset operation member which adjusts the size of the aperture.

Objects of the present invention are also achieved in a camera body for use with a plurality of interchangeable lenses, the camera body having a detector to detect whether an attached interchangeable lens is provided with an aperture ring, a control unit to control an aperture of the attached interchangeable lens when the attached interchangeable lens does not have an aperture ring or when the attached interchangeable lens does have an aperture ring and the aperture ring is set at a preset value.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
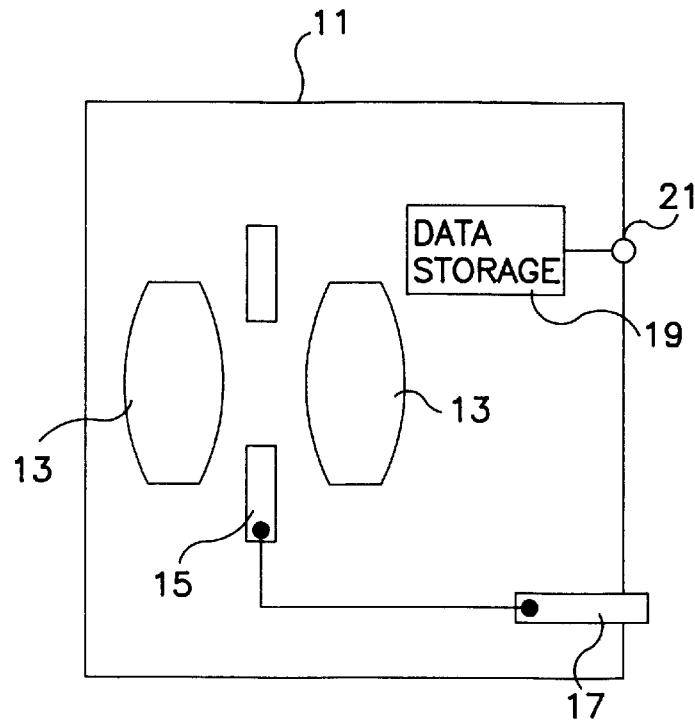
FIG. 1 is a block diagram of an interchangeable lens without an aperture preset operation member.

Reference will now be made in detail to the present preferred embodiments of the present invention, examples of which are illustrated in the accompanying drawings, wherein like reference numerals refer to like elements throughout.

FIG. 1 is a block diagram of an interchangeable lens without an aperture preset operation member. An interchangeable lens 11 is equipped with a photographic lens 13, an aperture mechanism 15 to adjust the aperture diameter, and a stop down lever 17 to drive the aperture mechanism 15. Collectively and as embodied herein, the aperture mechanism 15 and the stop down lever 17 may be referred to as the aperture controller. The aperture value of the interchangeable lens 11 is set by rotating the stop down lever 17 around the optical axis via a mechanism on an attached camera body (not shown), discussed hereinafter.

A data storage 19 stores information peculiar to the lens. The information stored in the data storage 19 is transmitted to the camera body through a mount contact point 21 (also known as an "output") placed near the lens mount (not shown). The information is preferably transmitted through clocked synchronous communications. The information preferably includes a flag denoting the lack of an aperture ring. This flag is set during the manufacturing process of the interchangeable lens 11 and more generally indicates the interchangeable lens 11 does not have an aperture preset operation member.

Figure 2:
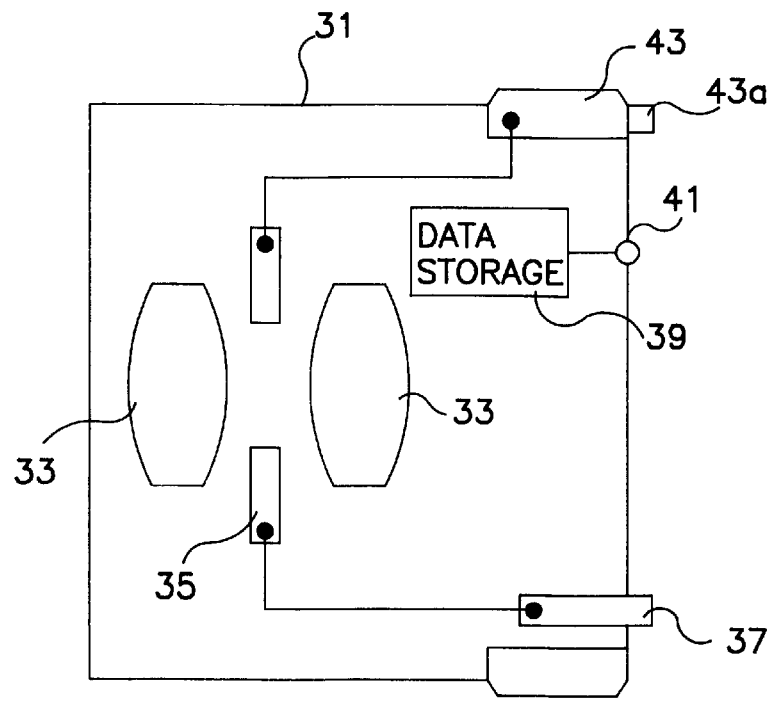
FIG. 2 is a block diagram of an interchangeable lens having an aperture preset operation member.

FIG. 2 is a block diagram of an interchangeable lens 31 having an aperture preset operation member 43, preferably comprising a so-called "aperture ring" and, as such, may be referred to hereinafter as the aperture ring 43. The aperture ring 43 has a protrusion 43a, described hereinafter. Similar to the interchangeable lens 11 (FIG. 1), the interchangeable lens 31 is equipped with a photographic lens 33, an aperture mechanism 35, and a stop down lever 37 to drive the aperture mechanism 35. The interchangeable lens 31 also has a data storage 39 to store information peculiar to the interchangeable lens 31. The storage 39 can transmit the information to the camera body (not shown) through a mount contact point 41. The information includes a flag for denoting the presence of the aperture ring 43. The flag is incorporated during the manufacturing process of the interchangeable lens 31.

The aperture ring 43, is provided on the side of the interchangeable lens 31 which attaches to the camera body. The aperture value of the aperture mechanism 35 is set based on the rotational position of the aperture ring 43 around the optical axis. More specifically, the number of stop down steps is controlled according to the position of the aperture ring 43. The stop down lever 37 may also stop down the aperture mechanism 35. Generally, the stop down lever 37 cannot cause the aperture mechanism 35 to stop down further than the number of stops set by the aperture ring 43. Consequently, if the aperture value set by the aperture preset operation member is, for example, 5.6 on an interchangeable lens 31 having a possible aperture value from 1.4 to 16, the aperture value set by the stop down lever 37 is limited to the 1.4–5.6 range.

Figure 3:
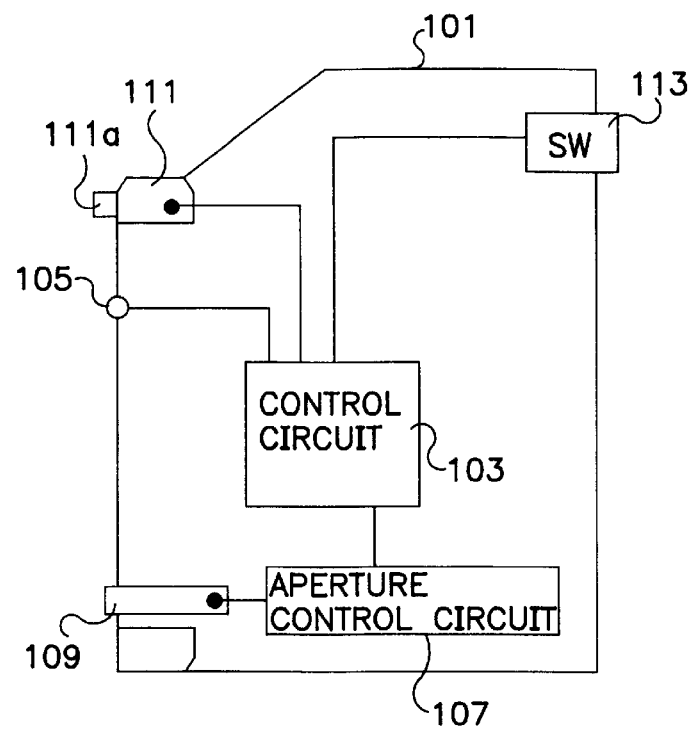
FIG. 3 is a block diagram of a camera body in accordance with a first preferred embodiment of the present invention.

FIG. 3 is a block diagram of a camera body 101 in accordance with a first preferred embodiment of the present invention. The camera body 101 does not have an aperture value setting operation member (described hereinafter). The camera body 101, however, is provided with a control circuit 103 which serves as an aperture control permission unit. The control circuit 103 typically comprises a microcomputer. The control circuit 103 obtains various signals to assist with controlling the internal functions of the camera, including acting as the aperture control permission unit.

When the camera body 101 is connected with an interchangeable lens 11 or 31, the contact points 21 or 41 of the interchangeable lens 11 or 31 contact an electrical contact point 105 provided near a lens mount (not shown) on the camera body 101. The contact serves as a communication path. The camera body 101 obtains the information stored in the data storage 19 or 39 within the interchangeable lenses 11 or 31 via the communication path.

A mode selection switch (SW) 113, provided on the camera body 101, changes exposure modes of the camera. By operating the mode selection switch 113, a photographer can select one of at least four modes: the M mode, by which the photographer can randomly set both shutter speed and aperture value; the S mode, by which the photographer sets the shutter speed while the camera body 101 automatically sets the aperture value; the A mode, by which the photographer sets the aperture value while the camera body 101 automatically sets the shutter speed; and one P mode, by which the camera body 101 automatically sets both the shutter speed and the aperture value.

An aperture interlocking ring 111, provided on the camera body 101, has a protrusion 111a, provided on the side of the camera body 101 closest to the lens mount, which engages the protrusion 43a of the aperture ring 43 of the interchangeable lens 31. By detecting the rotational position of the aperture interlocking ring 111, the rotational position of the aperture ring 43 can be detected, that is, an aperture value set by the aperture 43 can be detected. The detected preset aperture value is stored in the control circuit 103.

An aperture value control circuit 107 controls the driving of an aperture drive lever 109 according to a control signal from control circuit 103. This allows aperture control from the camera body 101, as opposed to aperture control from the interchangeable lens 31. The aperture drive lever 109 controls the position of stop down levers 17 or 37 on the respective interchangeable lens 11 or 31.

If an interchangeable lens 11, without an aperture ring, is mounted on the camera body 101, neither the A mode nor the M mode, which requires the setting of the aperture value, can be used, as there are no operational members on either interchangeable lens 11 or on the camera body 101 to facilitate setting of the aperture.

On the other hand, if an interchangeable lens 31, with an aperture ring 43, is mounted, an aperture value, during the A mode or the M mode, can be set by the aperture ring 43.

Figure 6:
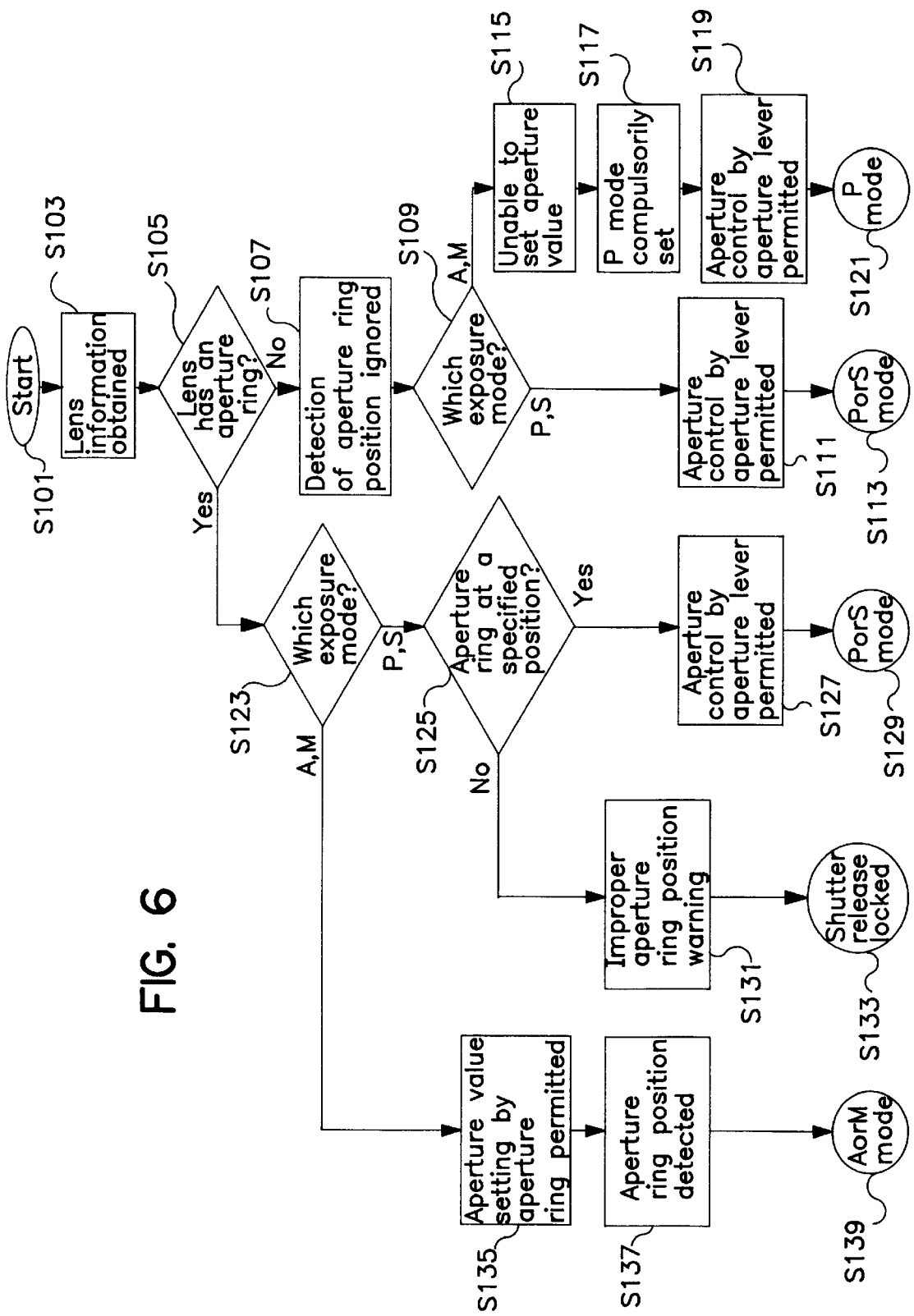
FIG. 6 is a flowchart of a process sequence in accordance with the first preferred embodiment of the present invention.

FIG. 6 is a flowchart of a process sequence for a camera system in accordance with the first preferred embodiment of the present invention. The process sequence starts in step S101. When a shutter release button (not shown) is activated on the camera body 101, information peculiar to the interchangeable lens 11 or 31, mounted on the camera body 101 (hereinafter just "lens"), is obtained from the data storage 19 or 39 within the lens at step S103. A flag indicating whether the lens has an aperture ring 43 is verified in step S105. If a flag, indicating that the lens does not have an aperture ring 43, is output, in other words if an interchangeable lens 11 is mounted, the process sequence goes to step S107 and the detection of the position of the aperture interlocking ring 111 is ignored.

Subsequently, in step S109, an exposure mode, selected by the mode selection switch 113 is detected. If the exposure mode is either the P mode or the S mode, the process sequence goes to step S111 and aperture control by the aperture drive lever 109 is permitted. In this case, the stop down lever 17 is controlled from the camera body 101, thereby activating either the P mode or the S mode in step S113.

If, in step S109, the selection of either the A mode or the M mode is detected, the process sequence proceeds to step S115 and a determination is made that the aperture value cannot be set by an aperture ring (as it is absent) and the exposure mode is compulsorily set to the P mode in step S117. Thereafter, in step S119, aperture control, using the aperture drive lever 109, is permitted, thereby activating the P mode in step S121. Although the exposure mode was compulsorily set in the P mode in step S117, it is also acceptable to compulsorily set the exposure mode to the S mode, which also does not require the setting of an aperture value.

On the other hand, if a flag, indicating that the lens has an aperture ring 43 (i.e., the interchangeable lens 31 is mounted), is detected in step S105, the process sequence proceeds to step S123 and exposure mode is detected. If the exposure mode is either the P mode or the S mode, the process sequence goes to step S125 and the position of aperture interlocking ring 111 is detected to check whether the aperture ring 43 is set at a specified position, such as the minimum aperture position. If the aperture ring 43 is set at the specified position, aperture control using the aperture drive lever 109 is permitted in step S127. Since all aperture values can be controlled by the stop down lever 37, either the P mode or the S mode is subsequently activated in step S129.

If the aperture ring 43 is not set at the minimum aperture position in step S125, a warning is displayed subsequently in step S131, for example, on a liquid crystal display (not shown) on the camera body 101. The liquid crystal display serves as an alarm to indicate that the position of the aperture ring 43 is improper. Subsequently, a shutter release lock process that prevents shutter release may be executed by the control circuit 103 in step S133. In lieu of the shutter release lock process, it is also acceptable to control the aperture value within a range between the open F value and the aperture value at which the aperture ring 43 is set.

If the exposure mode is either the A mode or the M mode in step S123, the process sequence proceeds to step S135 and setting an aperture value with the aperture ring 43 is permitted. Subsequently, the position of the aperture ring 43 is detected by the aperture interlocking ring 111 in step S137, thereby activating either the A mode or the M mode in step 139.

Although the first embodiment of the present invention has been described with respect to a specific configuration, it will be recognized that the first embodiment is not limited to that specific configuration. For example, it will be recognized that various control switches can take various configurations, such as the aperture ring being an aperture lever or switch.

Figure 4:
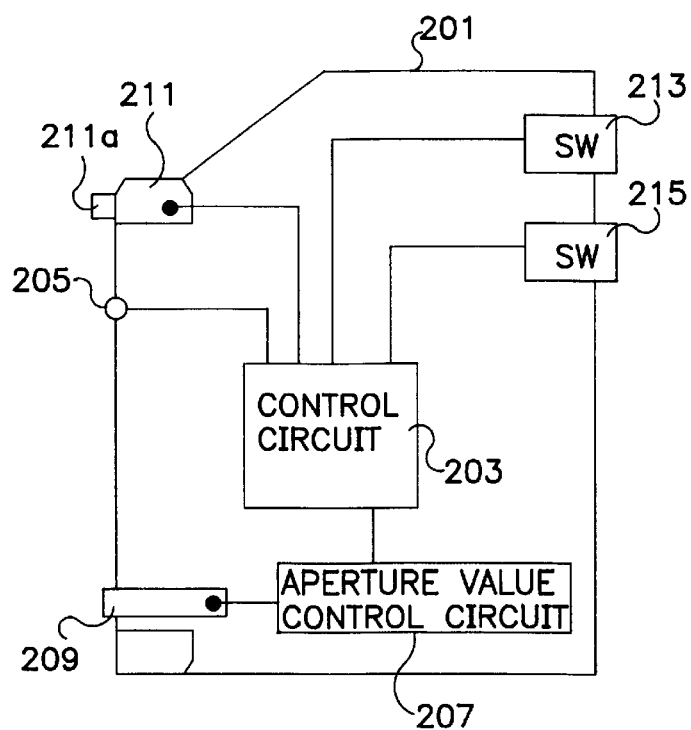
FIG. 4 is a block diagram of a camera body in accordance with a second preferred embodiment of the present invention.

FIG. 4 is a block diagram of a camera body 201 in accordance with a second preferred embodiment of the present invention. In accordance with the second preferred embodiment of the present invention, the camera body 201 is provided with an aperture value setting dial 215 (also known as an "aperture value setting operation member"). Similar to the camera body 101, the camera body 201 is also provided with a control circuit 203, an electrical contact point 205, an aperture value control circuit 207, an aperture drive lever 209, an aperture interlocking ring 211 having a protrusion 211a, and a mode selection switch 213. The aperture value setting dial 215 is a dial provided, for example, on a portion of the camera body 201. The aperture value setting dial 215 is manipulated to set the aperture value when the selected exposure mode is either the A mode or the M mode. The set aperture value is stored in the control circuit 203 and is used to control the aperture drive lever 209 which drives the stop down lever 17 or 37.

In the second preferred embodiment, as the camera body 201 has the aperture value setting dial 215, both the A mode or the M mode, in which a photographer can set the aperture value, may be selected even if an interchangeable lens 11 without an aperture ring 43 (as shown in FIG. 1), is mounted. On the other hand, if an interchangeable lens 31, with an aperture ring (as shown in FIG. 2), is mounted, as the aperture is set by the aperture value setting dial 215 on the camera body 201, it is no longer necessary to set the aperture value using the aperture ring 43. As a result, the aperture interlocking ring 211 only needs to detect whether the aperture ring 43 on the interchangeable lens 31 is set at a specified position which does not restrict the stop down operation of the stop down lever 37. In accordance with the second preferred embodiment of the present invention, it is detected whether aperture ring 43 is set at the minimum aperture position.

Figure 7:
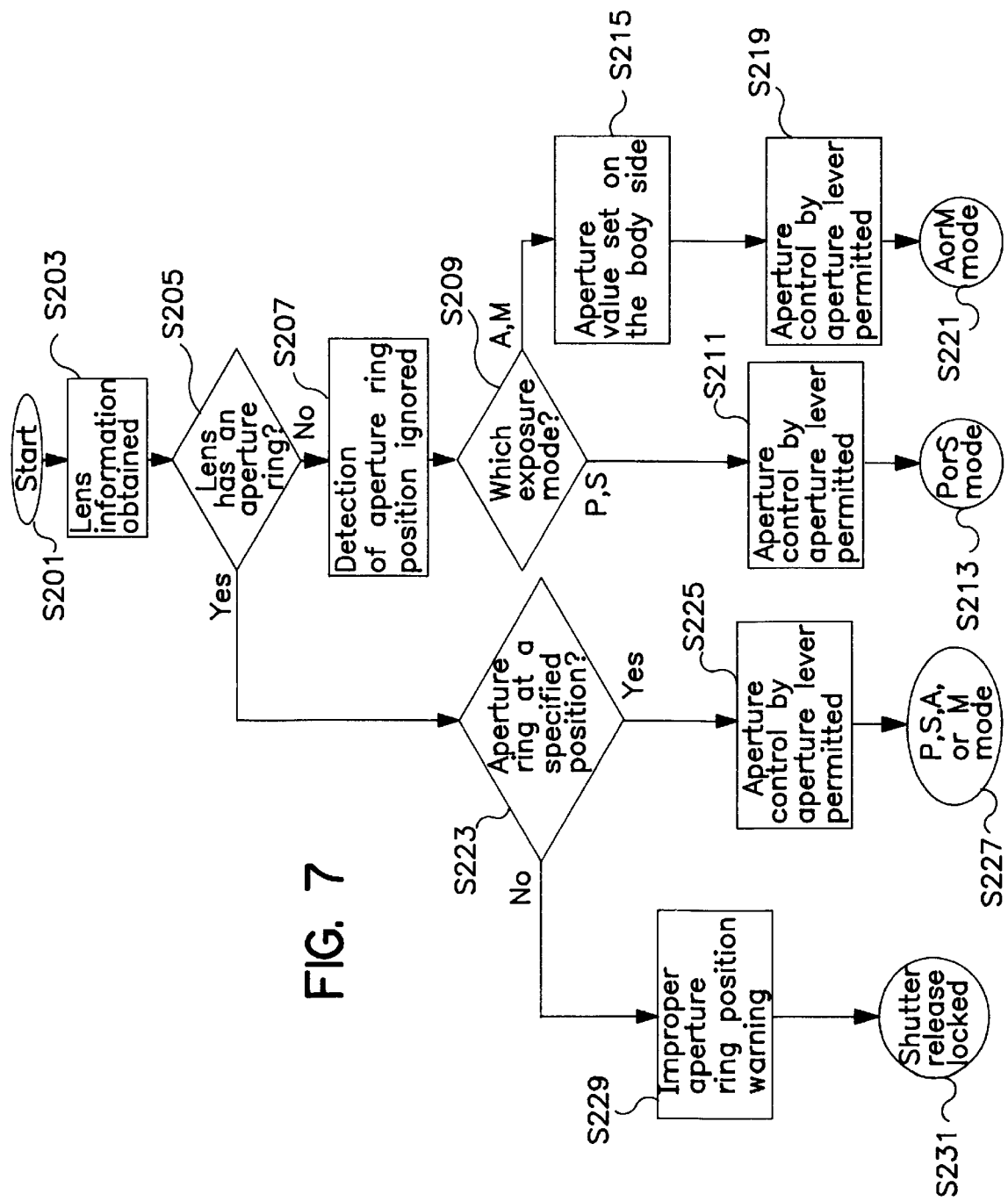
FIG. 7 is a flowchart of a process sequence in accordance with the second preferred embodiment of the present invention.

FIG. 7 is a flowchart of a process sequence for a camera system in accordance with the second preferred embodiment of the present invention. The process sequence is started in step S201. When the camera body 201 is activated, information peculiar to the mounted interchangeable lens 11 or 31 (hereinafter just "lens") is obtained from the data storage means 19 or 39 in step S203. Subsequently, in step S205, a flag indicating whether the interchangeable lens has an aperture ring 43 is checked. If the lens outputs a flag indicating that the lens does not have an aperture ring 43 (i.e., if lens 11 shown in FIG. 1 is mounted), the process sequences goes to step S207 and the detection of the position of aperture interlocking ring 211 is ignored.

Next, in step S209, the exposure mode selected by the mode selection switch 213 is checked. If the exposure mode is either the P mode or the S mode, the process sequence goes to step S211 and aperture control using the aperture drive lever 209 is permitted. In this case, the stop down lever 17 is controlled from the camera body 201, thereby activating either the P or the S mode in step S213.

If the selection of either the A mode or the M mode is detected in step S209, an aperture value is set by aperture value setting dial 215 on the camera body 201 at step S215. Thereafter, exposure control by the aperture drive lever 209 is permitted in step S219, thereby activating the A or M mode in step S221. In this case, the control circuit 203 controls the position of the aperture drive lever 209 according to an aperture value set by the aperture value setting dial 215, thereby setting the lens aperture 15 to a desired aperture diameter via the stop down lever 17.

If, in step S205, it is detected that the flag indicating that the lens has an aperture ring (i.e., the interchangeable lens 31 of FIG. 2 is mounted), the position of the aperture interlocking ring 211 is detected in step S223 to verify if aperture ring 43 on the interchangeable lens 31 is at a specified position. For example, the specified position is preferably a minimum aperture position. As it is possible to use the entire aperture range using the stop down lever 37, if the aperture ring 43 is set at the minimum aperture position, aperture control by the aperture drive lever 209 is permitted in step S225. Accordingly, any one of the P mode, S mode, A mode, or M mode is activated, according to the setting of the mode selection switch 213, in step S227. Thus, photographic operation is possible in any exposure mode without using the aperture ring, on the interchangeable lens 31 as the camera body 201 has an aperture value setting dial 215.

If, in step S222, the aperture ring 43 is not set at the minimum aperture position, a warning is displayed in step S229 to indicate that the position of the aperture ring is improper. A shutter release lock process that does not allow shutter release is thereafter executed in step S231.

Although the second embodiment of the present invention has been described with respect to a specific configuration, it will be recognized that the second embodiment is not limited to that specific configuration. That is, modifications can be achieved while obtaining the overall purpose of the invention.

Figure 5:
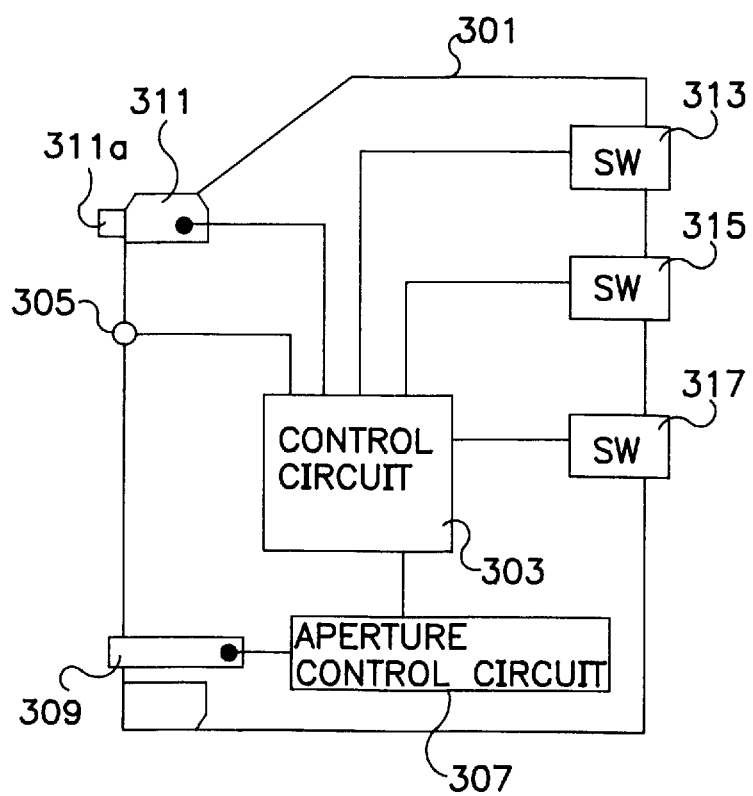
FIG. 5 is a block diagram of a camera body in accordance with a third preferred embodiment of the present invention.

FIG. 5 is a block diagram of a camera body 301 in accordance with a third preferred embodiment of the present invention. The camera body 301 accepts either the interchangeable lens 11, without an aperture ring 43 (as shown in FIG. 1), or the interchangeable lens 31 with an aperture ring (as shown in FIG. 2). A main improvement, in accordance with the third preferred embodiment of the present invention, is the addition of an aperture value setting member selection switch 317. Similar to the camera body 201, shown in FIG. 3, the camera body 301 includes a control circuit 303, an electrical contact point 305, an aperture control circuit 307, an aperture drive lever 309, an aperture interlocking ring 311, provided with a protrusion 311a, a mode selection switch 313 and an aperture value setting dial or switch 315.

When the exposure mode is either the A mode or the M mode, the aperture can be set by either the aperture value setting dial 315 or the aperture ring 43 (assuming an interchangeable lens 31 is mounted). The photographer can choose which mechanism to use for setting the aperture value by setting the aperture value setting member selection switch 317. The selected information is entered in the control circuit 303.

In accordance with the third embodiment, during either the A mode or the M mode in which an aperture is set, if an interchangeable lens 11 is mounted, the aperture is controlled by using aperture value setting dial 315 on the camera body 301. If, however, an interchangeable lens 31 is mounted, the photographer can select the lens aperture ring 43 or the aperture value setting dial 315 for aperture control by setting the aperture value setting member selection switch 317.

Figure 8:
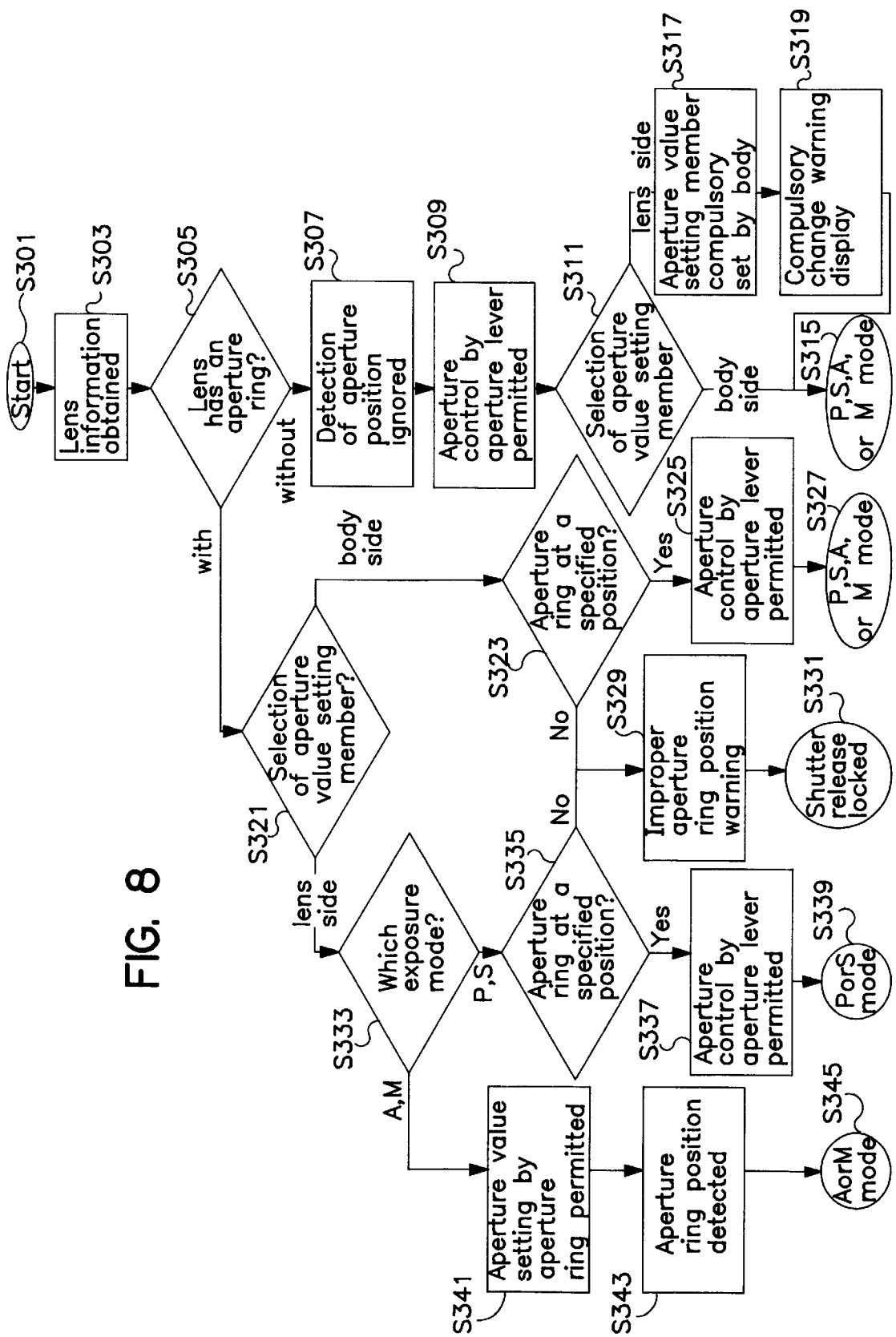
FIG. 8 is a flowchart of a process sequence in accordance with the third preferred embodiment of the present invention.

FIG. 8 is a flowchart of a process sequence for a camera system in accordance with the third preferred embodiment of the present invention. The process sequence starts in step S301. When the camera body 301 is activated, information peculiar to the attached interchangeable lens 11 or 31 (hereinafter just "lens") is obtained from the data storage 19 or 39 in step S303. Subsequently, a flag indicating whether the lens has an aperture ring 43 is checked in step S305.

If the flag indicates that the lens does not have an aperture ring (i.e., if lens 11 of FIG. 1 is mounted), the process sequence goes to step S307 and the detection of the position of the aperture interlocking ring 311 is ignored. Subsequently, aperture control by the aperture drive lever 309 is permitted in step S309. Thereafter, in step S311, the state of the aperture value setting member selection switch 317 is detected.

If the camera body side (i.e., the aperture value setting dial 315) is selected, all exposure modes are permitted, and the exposure mode is executed according to the setting of the mode selection switch 313 in step S315. If, in step S311, the lens side (i.e., the aperture ring 43) is set by the aperture value setting member selection switch 317, the process sequence goes to step S317 and the aperture value setting member is compulsorily changed to the aperture value setting dial 315 on the camera body 301. A warning indication is subsequently provided in step S319 to indicate that the selected aperture value setting member has been compulsorily changed. For example, a blinking display of the aperture value may be used or an alarm sound may be generated. Subsequently, an exposure mode that corresponds to the setting of the mode selection switch 313 is activated in step S315.

If, in step S305, it is detected that the lens has output a flag indicating the presence of an aperture ring 43 (i.e., if the interchangeable lens 31 of FIG. 2 is mounted), the state of the aperture value setting member selection switch 317 is subsequently detected in step S321. If the camera body side (i.e., the aperture setting dial 315) is selected, the position of the aperture interlocking ring 311 is detected in step S323 to verify if the aperture ring 43 is set at a specified position, for example, at the minimum aperture position. If the aperture ring 43 is set at the minimum aperture position, aperture control by the aperture drive lever 309 is subsequently permitted at step S325. Subsequently, one of the P mode, S mode, A mode, or M mode is activated according to the setting of the mode selection switch 313. All exposure modes are available, without the use of the aperture ring 43, as the camera body 301 has an aperture value setting dial 315.

If the aperture ring 43 is not set at the minimum aperture position in step S323, the process sequence proceeds to step S329 and a warning is displayed to indicate that the position of the aperture ring is improper. Subsequently, in step S331, a shutter release lock process is executed which prohibits shutter release.

If in step S321, the lens side is selected by the aperture value setting member selection switch 317, the process sequence goes to step S333 and the state of the mode selection switch 313 is detected. If either the P mode or the S mode is selected as the exposure mode, the position of aperture interlocking ring 311 is detected in step S335 to verify whether the aperture ring 43 is set at a specified position, for example, at the minimum aperture position. If the aperture ring 43 is set at the minimum aperture position, all aperture values can be controlled by using the stop down lever 37. Therefore, aperture control by the aperture drive lever 309 is subsequently permitted in step S337. Thereafter, either the P mode or the S mode is activated in step S339.

As all aperture values cannot be controlled by the stop down lever 37, if the aperture ring 43 is not set at the minimum aperture position in step S325, a warning is displayed in step S329 to indicate that the position of the aperture ring is improper. Thereafter, a shutter release lock process is executed to prevent shutter release in step S331.

If either the A mode or the M mode is selected for the exposure mode in step S333, the setting of the aperture value by the lens side aperture ring 43 is permitted in step S341. The set value on the aperture ring 43 is detected by detecting the position of the aperture interlocking ring 311 in step S343, and subsequently, in step S345, either the A mode or the M mode is activated according to the set value.

Although a few preferred embodiments of the present invention have been shown and described, it would be appreciated by those skilled in the art that changes may be made in these embodiments without departing from the principles and spirit of the invention, the scope of which is defined in the claims and their equivalents. For example, although an aperture ring on the lens side is used as an example for the aperture preset operation member, other configurations may also be used. Moreover, although a dial is used as an example for the camera side aperture value setting member, it is also possible to use two push buttons that decrease and increase the aperture value respectively.

What is claimed is:

1. A camera system comprising:

a first interchangeable lens having an aperture controller to set an aperture value based on an external control signal and an aperture preset operation member to set the aperture value regardless of the external control signal from the camera body, the first interchangeable lenses having an output to output information indicating the presence of the aperture preset operation member;

a second interchangeable lens having an aperture controller but lacking an aperture preset operation member, the second interchangeable lens having an output to output information indicating the lack of an aperture preset operation member; and a camera body to which the first and second interchangeable lenses may be interchangeably attached, the camera body having an aperture control circuit to issue the external signal to the attached first or second interchangeable lens;

a detector to detect the aperture value set by the aperture preset operation member on the first interchangeable lenses;

an input to receive the information as to the presence of the aperture preset operation member from the attached first or second interchangeable lens; and a control circuit, when the first interchangeable lens is attached, to permit control of the aperture by the aperture control circuit if the detector detects that the aperture value set by the aperture preset operation member is a specific value or to restrict the control of the aperture by the aperture control circuit when the detector detects that the set aperture value is not a specific value, and when the second interchangeable lens is attached, the control circuit permits control of the aperture by the aperture control circuit.

2. A camera system, as set forth in claim 1, wherein the camera body selects between manual or automatic aperture control based upon a selected exposure mode, manual aperture control being performed via the lens aperture preset operation member and automatic aperture control being performed by the control circuit via the aperture control circuit.

3. A camera system, as set forth in claim 2, wherein the camera body further comprises an alarm to give a warning when switching to manual aperture control if the second interchangeable lens is mounted.

4. A camera system as set forth in claim 2, wherein the camera body further comprises an inhibitor to inhibit switching to manual aperture control if the second interchangeable lens is mounted.

5. A camera system as set forth in claim 2, wherein the camera body switches to automatic aperture control if the second interchangeable lens is mounted.

6. A camera system, as set forth in claim 1, wherein the specific value corresponds to a maximum aperture value for the mounted interchangeable lens.

7. A camera system, as set forth in claim 1, wherein the first and second interchangeable lenses are each provided with a storage to retain the information as to the presence of an aperture preset operation member.

8. A camera system, as set forth in claim 1, wherein the camera body further comprises an aperture value setting member to allow a user to input a desired aperture.

9. A camera system, as set forth in claim 8, wherein when said first interchangeable lens is attached to said camera body the user may set the aperture value with the aperture value setting member when the aperture value set by the aperture value preset member is a specified value.

10. A camera system, as set forth in claim 9, wherein the specified value corresponds to a maximum aperture value.

11. A camera system, as set forth in claim 8, wherein when said second interchangeable lens is attached to said camera body the user may set the aperture value using the aperture value setting member.

12. A camera system, as set forth in claim 8, wherein the camera body further comprises an aperture value setting member selection switch which selects between setting the aperture value with said aperture value preset member and setting the aperture value with said aperture value setting member.

13. A camera system, as set forth in claim 12, wherein when said second interchangeable lens is attached to said camera body and said aperture value setting member selection switch selects setting the aperture value with said aperture value preset member, the aperture value setting member is compulsorily set by said control circuit as the appropriate member to set the aperture value.

* * * * *